(12) United States Patent
Krasner (10) Patent No.: US 8,243,712 B2
(45) Date of Patent: Aug. 14, 2012

(54) BASE STATION SYNCHRONIZATION USING MULTI-COMMUNICATION MODE USER EQUIPMENT

(75) Inventor: Norman F. Krasner, Emerald Hills, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1242 days.

(21) Appl. No.: 11/431,454

(22) Filed: May 10, 2006

(65) Prior Publication Data

US 2006/0280226 A1 Dec. 14, 2006

Related U.S. Application Data

(60) Provisional application No. 60/679,704, filed on May 10, 2005.

(51) Int. Cl.
*H04J 3/06* (2006.01)
(52) U.S. Cl. ........ 370/350; 370/311; 370/337; 455/502; 455/525; 375/355; 375/356
(58) Field of Classification Search .................. 370/315, 370/329, 331, 335, 342, 345, 350, 519; 455/450, 455/502
See application file for complete search history.

(56) References Cited

U.S. PATENT DOCUMENTS

| | | | |
|---|---|---|---|
| 6,526,039 B1 * | 2/2003 | Dahlman et al. .............. | 370/350 |
| 6,665,541 B1 | 12/2003 | Krasner et al. | |
| 6,729,929 B1 * | 5/2004 | Sayers et al. .................. | 455/446 |
| 6,885,647 B1 * | 4/2005 | Chung et al. .................. | 370/335 |
| 6,993,342 B2 * | 1/2006 | Kuchibhotla et al. ......... | 455/450 |
| 7,171,225 B2 | 1/2007 | Krasner et al. | |
| 2001/0021179 A1 | 9/2001 | Tiedemann, Jr. et al. | |
| 2001/0022823 A1 * | 9/2001 | Renaud .......................... | 375/359 |
| 2002/0004227 A1 | 1/2002 | Ashkenazi et al. | |
| 2002/0042272 A1 * | 4/2002 | Wedi et al. ..................... | 455/442 |
| 2004/0190378 A1 | 9/2004 | Farmer | |
| 2005/0043046 A1 * | 2/2005 | Lee ............................... | 455/502 |
| 2005/0135325 A1 * | 6/2005 | Kang ............................. | 370/345 |
| 2006/0023653 A1 * | 2/2006 | Montalbano ................... | 370/315 |

FOREIGN PATENT DOCUMENTS

CN 1296679 A 5/2001

OTHER PUBLICATIONS

International Search Report and Written Opinion—PCT/US2006/018374, International Search Authority—European Patent Office—Jun. 8, 2008.
Office Action issued by China State Intellectual Property Office on Apr. 26, 2011, in connection with corresponding Chinese Application No. 200680024141.0.

* cited by examiner

*Primary Examiner* — George Eng
*Assistant Examiner* — Inder Mehra
(74) *Attorney, Agent, or Firm* — Liberty E. Mann (57) ABSTRACT

A method for time synchronizing base stations in an asynchronous cellular communication system via multi-communications mode user equipment is described. The method includes receiving time-of-day in a synchronous cellular communication signal with the user equipment operable in a synchronous cellular communications mode. Alternatively, time-of-day is received from a non-cellular system signal with user equipment that is operable to receive signals from the non-cellular system. After time-of-day is received the user equipment is switched to operate in an asynchronous cellular communications mode. Then a frame boundary of a received asynchronous cellular communication signal is time-tagged. Timing information is then transmitted to an entity of the asynchronous cellular communication system to determine time-of-day at the entity.

28 Claims, 9 Drawing Sheets

BASE STATION SYNCHRONIZATION USING MULTI-COMMUNICATION MODE USER EQUIPMENT

RELATED APPLICATIONS

This application claims priority to U.S. Provisional Application No. 60/679,704, filed on May 10, 2005.

BACKGROUND

1. Field

The method herein relates to communication systems, and more specifically to a method for synchronizing communication system base stations via user equipment that operates on more than one communications standard.

2. Relevant Background

Base station synchronization has traditionally been accomplished via Global Positioning Systems (GPS) located in mobile stations or in fixed observation sites, or via terrestrial landline signaling. Landline signaling is typically poor in performance, and synchronization via GPS requires GPS availability and hardware. Base station synchronization is important for several purposes, including wireless user equipment (UE) position determination and for handoffs.

Global Navigation Satellite Systems (GNSS), including Global Positioning Systems (GPS) and/or GALILEO systems, offer an approach to providing UE position determination. A GNSS user can derive precise navigation information including three-dimensional position, velocity and time-of-day (TOD) through information gained from orbiting satellite vehicles (SVs).

Approaches other than GNSS are also used to determine position location in cellular networks. Several approaches perform triangulation based upon the use of timing information sent between each of several base stations and a UE device, such as a cellular telephone. In one approach, called Time Difference of Arrival (TDOA), the times of reception of a signal from a UE is measured at several base stations, and these times are transmitted to a location server, which computes the position of the UE. For this approach to work, the times-of-day at the various base stations need to be coordinated to provide accurate location. Also, the position of the base stations needs to be known accurately.

An alternative method referred to as estimated observed time difference (EOTD), measures at the UE the times of arrival of signals transmitted from each of several base stations. This timing data may then be used to compute the position of the UE. Such computation may be done at the UE itself or at a location server, if the timing information so obtained by the UE is transmitted to this server via the link. Again, the base station times-of-day must be coordinated and their location accurately assessed. In either approach, the locations of the base stations are determined by standard surveying methods and may be stored in the base station or at the server in some type of computer memory.

A combination of either the EOTD and TDOA and a GNSS system is called a "hybrid" system. In any of the above methods, time coordination between the various cellular base stations is necessary for accurate position calculation of the UE.

Accurate timing at base stations also provides UEs timing information for aiding GPS based position calculations; such information may result in reduced time to first fix, and/or improved sensitivity with respect to assisted GPS (AGPS) systems. The required accuracy for these situations can range from a few microseconds to around ten milliseconds depending upon the performance improvement desired. In a hybrid system, the base station timing serves the dual purpose of improving the time of arrival (TOA) or TDOA operation as well as the GPS operation.

In certain cellular systems, such as a Code Division Multiple Access (CDMA) cellular network, all base stations are equipped with GPS satellite receivers and TOD is known to all base stations and UEs operating in the network. All base stations in such systems are time synchronized. Other, asynchronous systems, such as Global System for Mobile Communications (GSM), Universal Mobile Telecommunications System (UMTS), and Wideband Code Division Multiple Access (WCDMA), do not necessarily have time synchronized base stations and the base stations and UEs do not necessarily contain TOD information.

SUMMARY

The method described herein provides for base station synchronization in an asynchronous cellular communication system.

The method for base station synchronization described herein includes a user equipment device that is operable in a synchronous, cellular communication system, such as a CDMA network, as well as in an asynchronous, cellular communication system, such as a GSM, UMTS, or WCDMA network. The device includes means for synchronous, cellular communication, means for asynchronous, cellular communication, and means for time-tagging an asynchronous cellular communication signal with timing information received in a synchronous cellular communication signal.

Computer readable media in communication with the user equipment device embodies at least one set of instructions executable by a processor to perform method steps of beginning a timer based upon time-of-day information received in a synchronous cellular communication signal, and time-tagging a frame boundary of a received asynchronous cellular communication signal.

The method for base station synchronization includes receiving time-of-day in a synchronous cellular communication signal with the user equipment, which is operable in a synchronous cellular communications mode; switching the user equipment to operate in an asynchronous cellular communications mode; receiving an asynchronous cellular communication signal with the user equipment; time-tagging a frame boundary of the received asynchronous cellular communication signal; and transmitting timing information to an entity, such as a base station or server, of the asynchronous cellular communication system to determine time-of-day at the entity.

Alternatively, time-of-day is received from a non-cellular system signal with user equipment operable to receive signals from the non-cellular system. This timing information is then used by the UE to time-tag an asynchronous communication signal.

Advantageously, the method for base station synchronization provides for improved location determination of user equipment operating in the asynchronous communication system, improved user equipment handoffs, and permitting unambiguous time to be transmitted throughout the network for various purposes.

DRAWINGS

Embodiments and information relevant to the disclosed method are shown in the following figures, in which like reference numbers and designations indicate like or similar parts.

DETAILED DESCRIPTION

As used herein the term "user equipment" (UE) refers to cellular, cordless, personal communication system (PCS), or other types of wireless telephone devices, pagers, wireless personal digital assistants, notebook computers with wireless access, or any other wireless mobile station (MS), two-way radios, walkie-talkies, or other type of communications transceiver, regardless of whether they have valid subscriber identity module (SIM) or like identifiers.

Each UE, base station, server, and other communication system entity described herein includes the necessary and suitable processing means to perform the methods described herein. The term "computer", "processor", "processing system", or "processing means" is used herein to refer generally to a programmable apparatus or terminal in communication with a programmable apparatus, having a processor or other equivalent hardware, as well known by those skilled in the art. Each "computer", "processor", "processing system", or "processing means" referred to herein includes the necessary "computer-readable" media to perform the functions described herein, or is in communication with the necessary computer-readable media. The term "computer-readable medium" refers to any medium that participates in providing instructions to a processor for execution. As used herein, the term "code" and/or "software" refers to a set of instructions that are communicated to a processor.

"Computer readable media" may take many forms, including but not limited to, "non-volatile media", "volatile media", and "transmission media". "Non-volatile media" includes, for example, optical or magnetic disks such as used for a storage medium. "Volatile media" includes dynamic memory. Common forms of "computer-readable media" include floppy disks, flexible disks, hard disks, magnetic tape, other magnetic mediums, CD-ROM or other optical medium, RAM, PROM, EPROM, FLASH EPROM, and other memory chips or cartridges, a carrier wave, or any medium from which a computer or processor, as those terms are known to those skilled in the art, can read. Databases, data, and/or records can be recorded or stored on computer readable media.

The phrases "communicatively coupled" and "in communication with" as used herein refer to a coupling between elements or entities wherein information is transmittable from one to the other, whether such information is communicated directly, or via other elements or entities.

As used herein, synchronous, cellular duplex communication, refers to system communication wherein base stations are time-synchronized with one another, for example, as in a CDMA network where base stations are time-synchronized with other like base stations. Asynchronous, cellular duplex communication refers to system communication wherein base stations are not necessarily time-synchronized with one another, such as in GSM, UMTS, and/or WCDMA networks.

The term Global Positioning System (GPS), as used herein, will be understood to refer to any type of positioning system, such as GPS, assisted-GPS, Glonass systems, Global Navigation Satellite Systems (GNSS), pseudolite systems, and/or GALILEO systems.

In the following description certain details are provided to facilitate an understanding of the method for base station synchronization, but are not to be construed as limiting. Well-known devices, such as user equipment, base stations, and location servers, are presented in block diagram form so as not to be construed as limiting the method described herein.

Figure 1:
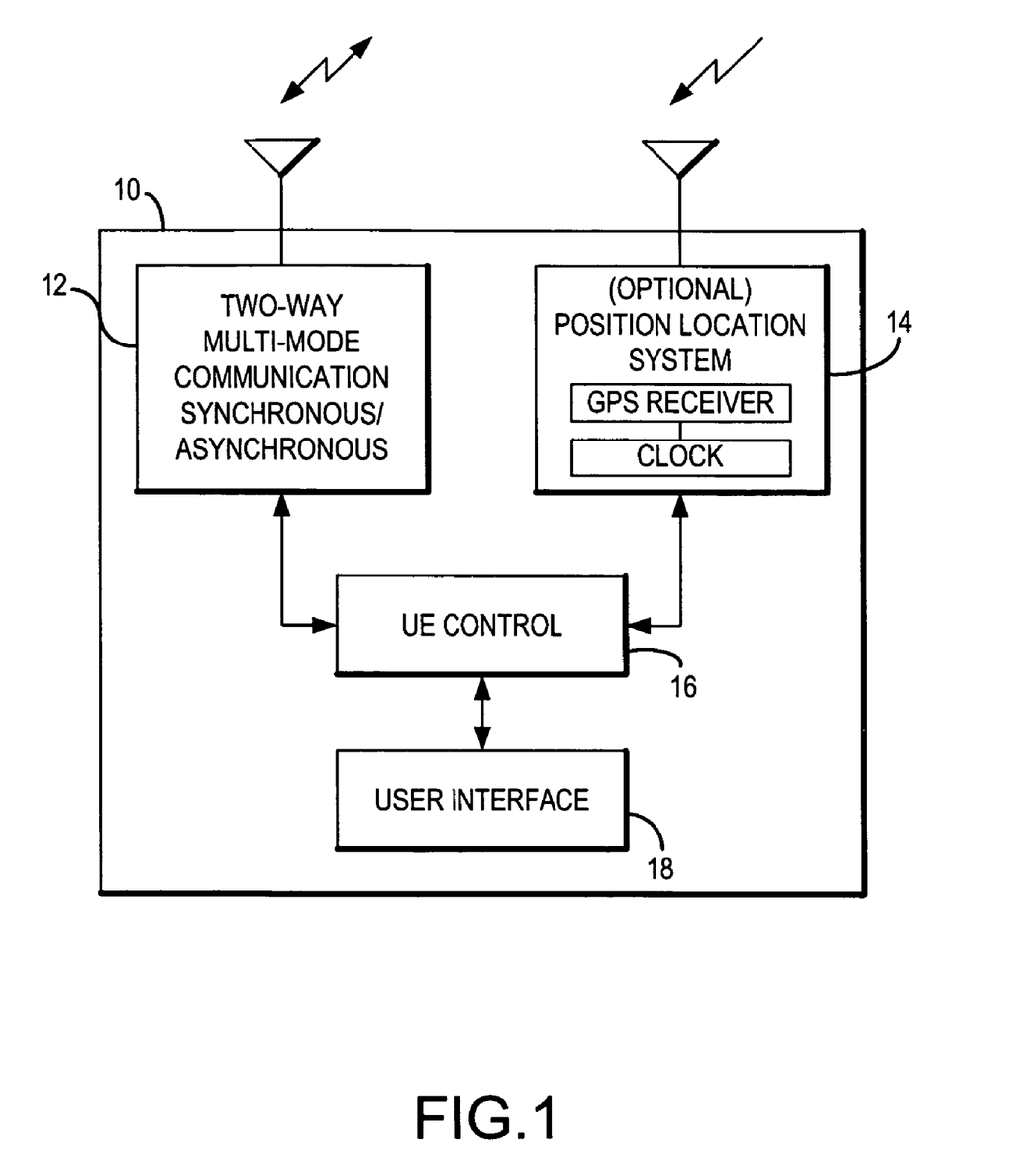
FIG. 1 illustrates an example of user equipment (UE) which may be used in a communications system.

Referring to FIG. 1, a simplified block diagram illustrates an example UE, such as a multi-mode mobile cellular telephone, that may be used in implementing the method for base station synchronization. User equipment 10 includes the appropriate means 12 for synchronous, cellular duplex communication, such as but not limited to a transceiver, CDMA modem and associated antenna. User equipment 10 further includes appropriate means for asynchronous, cellular duplex communication, such as but not limited to a transceiver, GSM modem, UMTS modem, and/or WCDMA modem, and associated antenna.

Optionally a position location system 14 is included in UE 10, such as but not limited to a GPS receiver and GPS clock, and associated antenna. The optional position location system 14 may alternatively be coupled to UE 10 instead of located within UE 10.

User equipment control 16 provides control and operation of UE 10. Control 16 may include one or more processors, appropriate computer readable media, suitable code, and other hardware and software, necessary for the control and operation of UE 10 and for implementation of certain operations of the method for base station synchronization described herein. User interface 18 allows a user to interface with UE control 16 in order to input and receive data from UE 10, whether voice, visual, textual, or other data. User interface 18 conventionally includes such components as microphones, speakers, displays, and keypads.

Figure 2A:
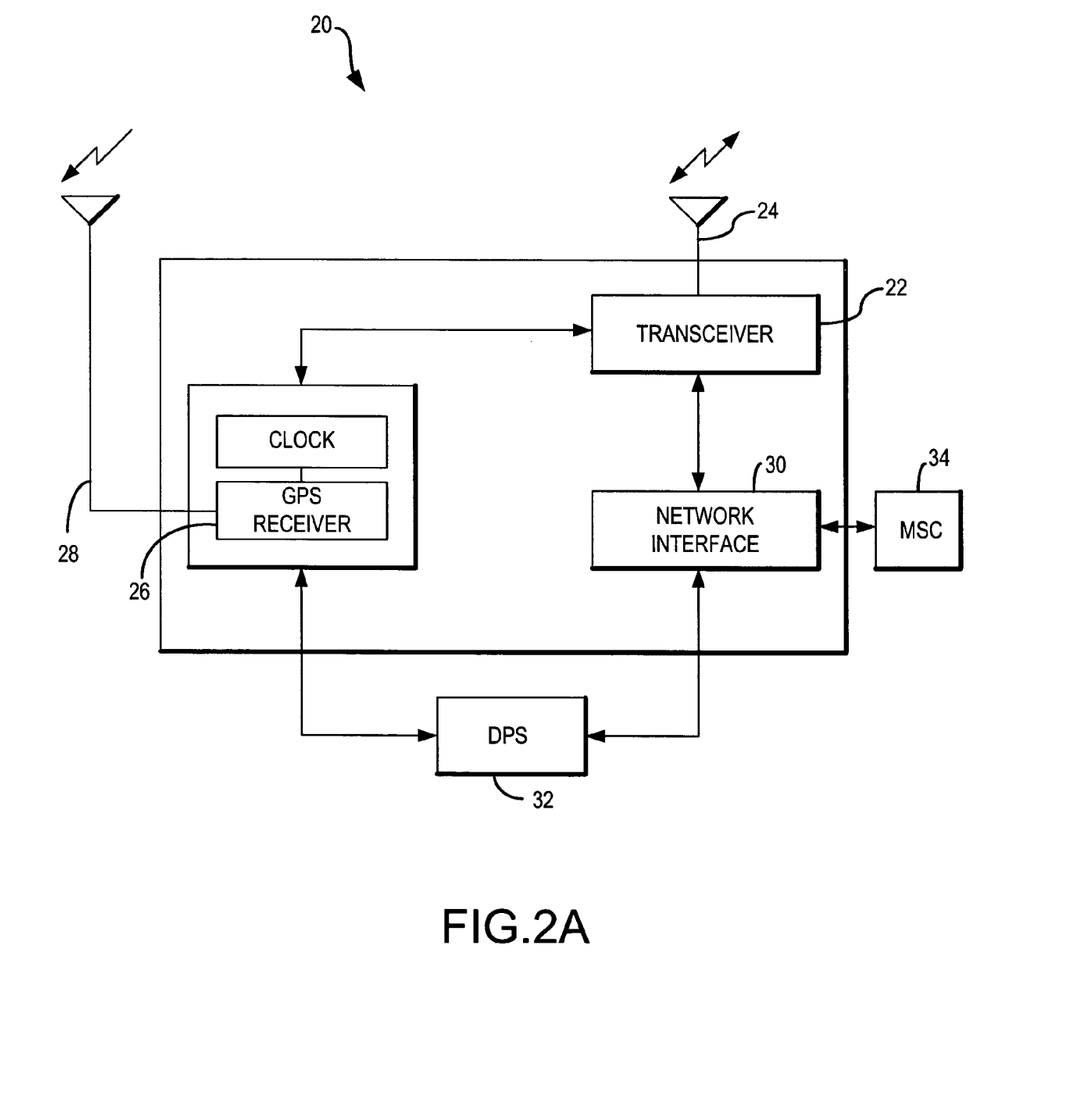
FIG. 2A illustrates an example of a communications system base station (BS)

Referring to FIG. 2A, a generalized depiction of a first base station (BS) 20 that may be implemented in accordance with the method for base station synchronization described herein, is provided. Base station 20 includes a cellular transceiver 22, which has at least one antenna 24 for communicating signals to and from a UE present in the area served by the base station 20. For example, UE 10 (FIG. 1) such as a mobile cellular telephone, may be one of the UEs served by the base station 20 depending upon the range of the signals typically transmitted by the UE 10. The transceiver 22 may be a conventional transceiver used to transmit and receive cellular signals, such as CDMA cellular signals. A GPS receiver 26 and associated antenna 28 enable base station 20 to maintain accurate TOD information at base station 20.

Base station 20 typically also includes a network interface 30 which transfers data to and from the transceiver 22 in order to couple the transceiver 22 to a mobile switching center (MSC) 34, as is known in the art. Base station 20 may also include a digital processing system (DPS) 32 which may be either positioned remotely relative to and coupled with the base station 20 or may be at the same site as the base station.

DPS 32 is also coupled to the network interface 30 in order to receive data or communications from the mobile switching center 34, and to receive data from the transceiver 22.

Figure 2B:
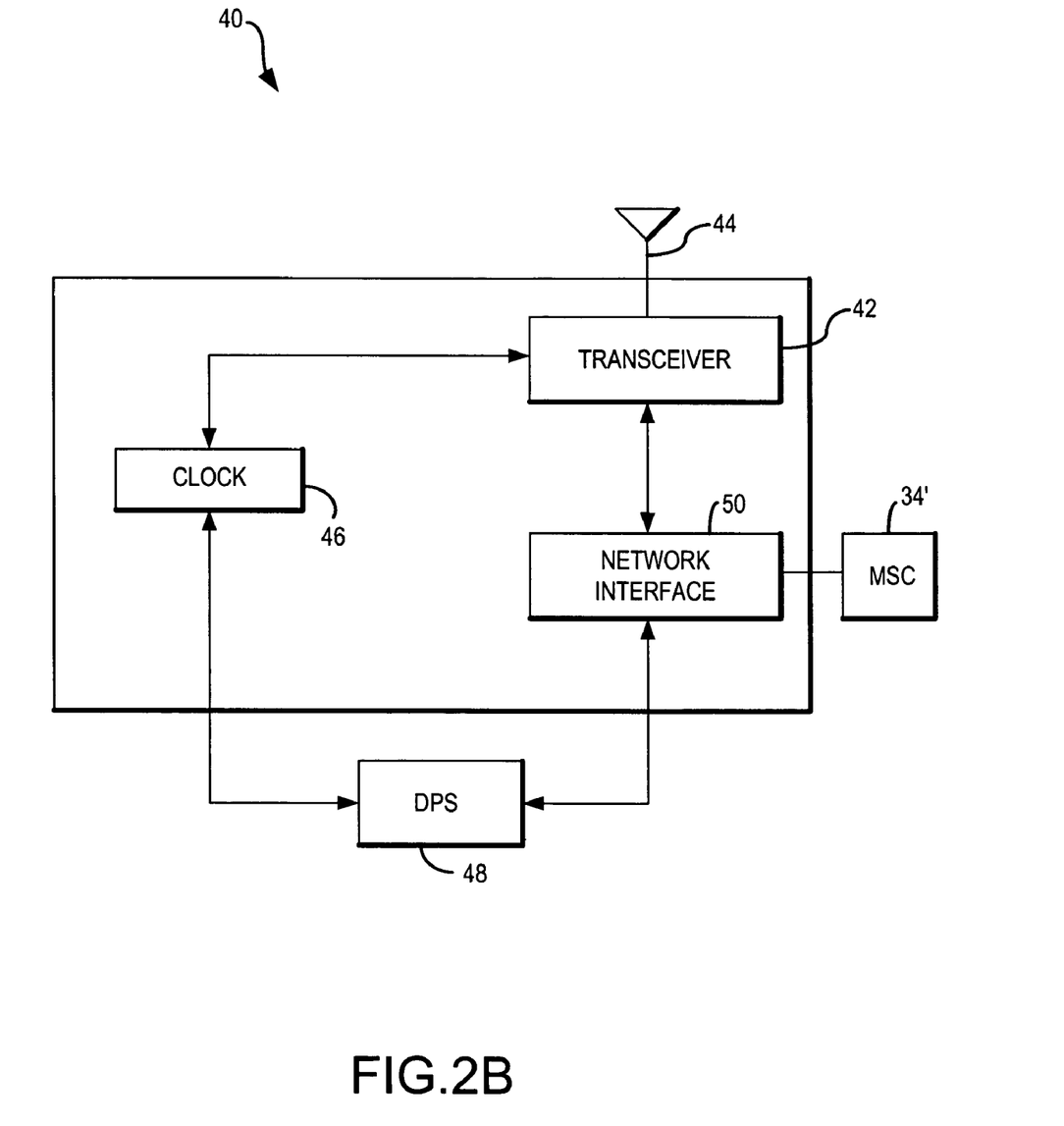
FIG. 2B illustrates an example of a communications system base station (BS)

FIG. 2B provides a generalized depiction of second base station (BS) 40 that may be used in accordance with the method for base station synchronization described herein. Base station 40 includes a cellular transceiver 42, which has at least one antenna 44 for communicating signals to and from a UE present in the area served by the base station 40, such as UE 10 (FIG. 1). The transceiver 42 may be a conventional transceiver used to transmit and receive cellular signals such as GSM, UMTS, or WCDMA, depending upon which type of air interface is utilized by the communications system in which the base station resides. Clock 46 may be a conventional system clock. The accuracy of this clock 46 may be improved according to the method for base station synchronization described herein, so as to synchronize this clock with other clocks in other base stations. In many cases clock 46 may be highly stable, but over a period of time the clock may drift by a large amount relative to any initial time setting. Base station 40 typically also includes a network interface 50 which transfers data to and from the transceiver 42 in order to couple the transceiver 42 to a mobile switching center (MSC) 34', which may or may not be the same MSC at that coupled to base station 20, as is known in the art. Base station 40 may also include a digital processing system (DPS) 48 which may be either positioned remotely relative to and coupled with the base station 40 or may be at the same site as the base station.

The DPS 48 is coupled to the clock 46 in order to adjust or recalibrate the time of the clock to thereby synchronize the clock to other clocks in other base stations according to the method for base station synchronization described herein. In many cases the clock 46 is highly stable but freerunning and it would affect network operation to alter the time strokes of the clock. Instead the time associated with the clock epochs can be adjusted. This is what is meant by "recalibrating." The DPS 48 is also coupled to the network interface 50 in order to receive data or communications from the mobile switching center 34', and to receive data from the transceiver 42, such as time-tagged frame markers transmitted for the purpose of synchronizing the clock 46 to other clocks in other base stations.

Figure 3:
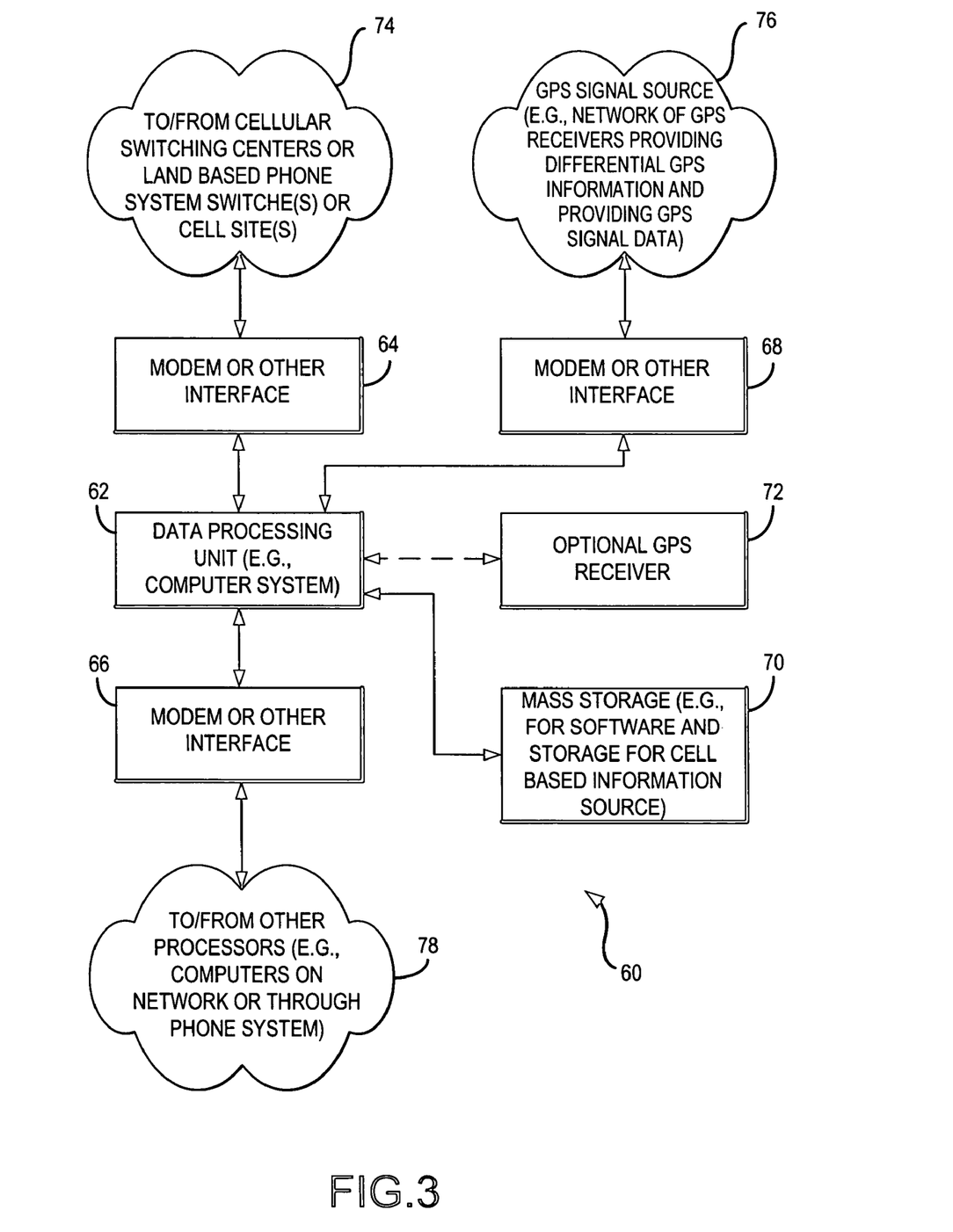
FIG. 3 illustrates an example of a communications system location server.

FIG. 3 provides an example of a communications system location server 60, sometimes referred to as a position determination entity (PDE). Server 60 may provide assistance data such as Doppler or other satellite assistance data to a GPS receiver of UE 10. Alternatively the location server 60 may perform a final position calculation rather than UE 10 (after receiving pseudoranges or other data from which pseudoranges can be determined from the UE) and then may forward this position determination to a base station.

The location server 60 typically includes a data processing unit such as a computer system 62, modem(s) or other interface(s) 64, 66 and 68, a mass storage device 70—such as for storing software and data—and optionally a GPS receiver 72. This location server 60 may be coupled to a plurality of different networks shown as networks 74, 76, and 78. The network 74 may include a cellular switching center or multiple cellular switching centers and/or the land based telephone system switches. Alternatively, the modem 64 may be coupled directly to cell sites such as a base station. The network 76 may be a network of reference GPS receivers which provide differential GPS information and may also provide GPS ephemeris data for use in calculating the position of user equipment. This network is coupled through the modem or other communication interface 68 to the data processing unit 62. Network 78 includes other computers or network components such as a data processing system 32 or 48, as shown in FIGS. 2A and 2B respectively, through optional interconnections not shown in FIGS. 2A and 2B. Also, the network 78 may include computer systems operated by emergency operators, such as the Public Safety Answering Points which respond to 911 telephone calls.

Figure 4:
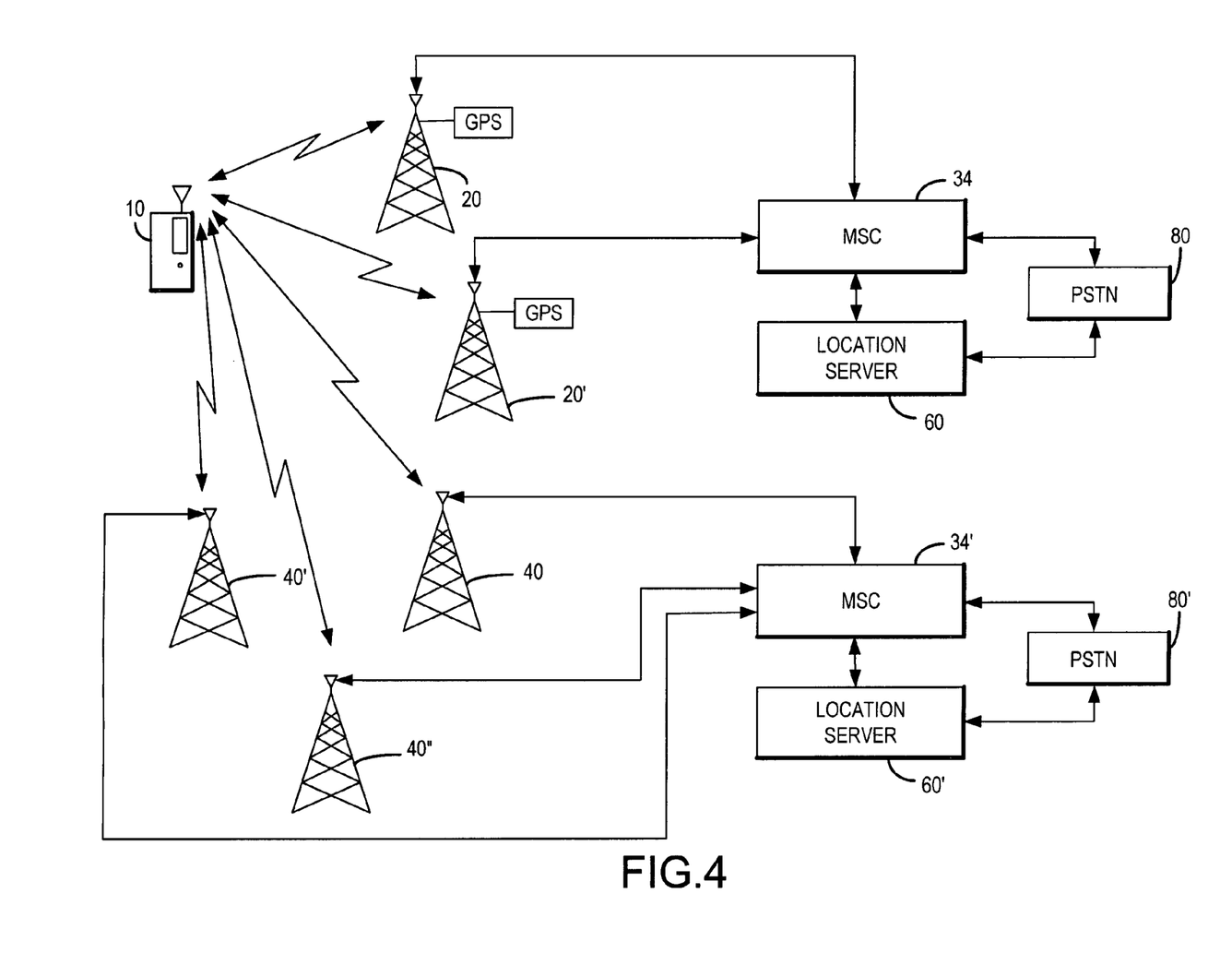
FIG. 4 illustrates various entities of a communications system.

Referring to FIG. 4, a diagram of various network entities is shown, one or more of which may be used in implementing the method for base station synchronization described herein. UE 10, such as that depicted in FIG. 1, having both synchronous, cellular duplex communication and asynchronous cellular duplex communication capabilities can communicate with one or more base stations, such as base station 20, which is time-synchronized with other like base stations, and base station 40, which is initially time-asynchronous with respect to other like base stations. For example, base station 20 is shown having a GPS receiver and could represent a base station of a typical CDMA network, while base station 40 could represent a base station of a typical GSM network.

Base stations 20 are in communication with mobile switching center (MSC) 34. It will be appreciated that multiple cellular base stations are typically arranged to cover a geographical area with radio coverage and these different base stations are coupled to at least one mobile switching center 34 as is well known. Thus multiple base stations would be geographically distributed but coupled together by a mobile switching center 34. The location server 60 is coupled to receive data from base stations 20 through the mobile switching center 34. The mobile switching center 34 provides signals, for example voice communications, to and from the land-line Public Switched Telephone Network (PSTN) 80 so that signals may be conveyed to and from UE 10 to other telephones such as land-line telephones on the PSTN 80 or other mobile telephones. In some cases the location server 60 may also communicate with the mobile switching center 34 via a cellular link. The location server 60 may also monitor emissions from several of the base stations in an effort to determine the relative timing of these emissions.

Base stations 40 of an asynchronous network are similarly in communication with a mobile switching center 34', which may or may not be the same mobile switching center as that coupled to base stations 20. Location server 60' is coupled to receive data from base stations 40 through the mobile switching center 34' and is coupled to PSTN 80'. Mobile switching center 34' is coupled with PSTN 80' so that signals may be conveyed to and from UE 10 to other UEs or other telephones.

Figure 5:
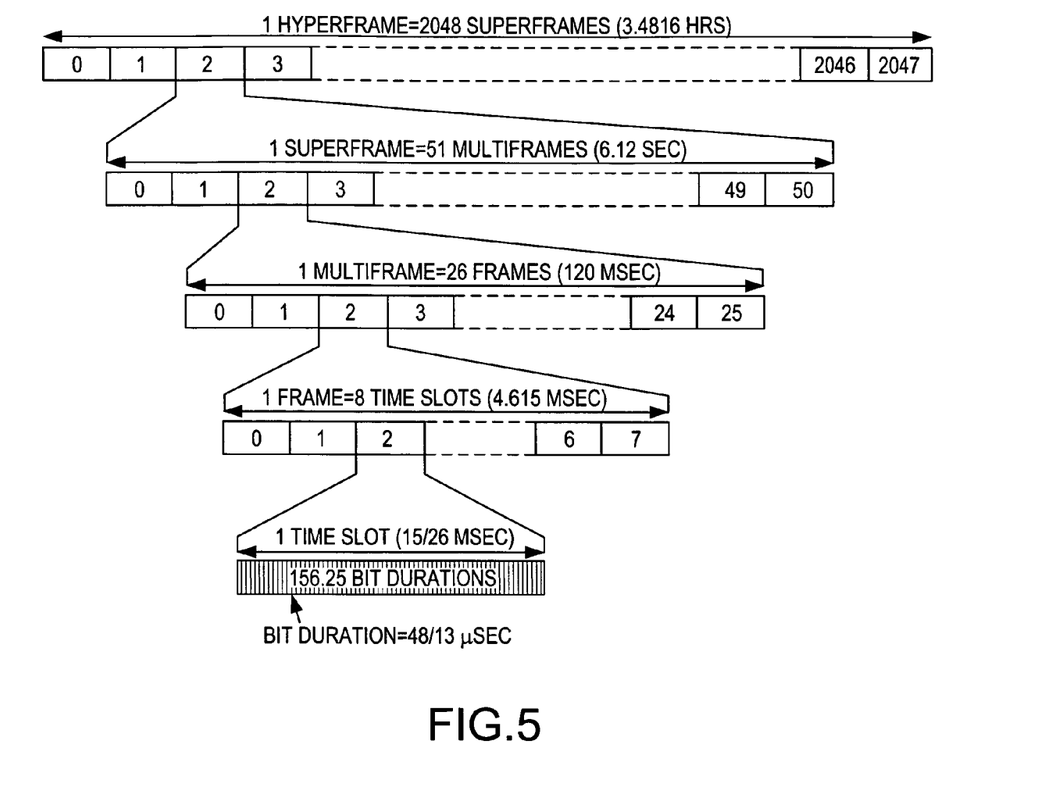
FIG. 5 illustrates a Global System for Mobile Communications (GSM) communication signal framing structure.

In the method for base station synchronization described herein, time-of-day information received from a first base station 20 in a synchronized communication network, such as a CDMA network, is used by a UE 10 to time-tag the framing structure of a signal, such as a GSM, UMTS or WCDMA signal received from a second base station 40. For example, the start of a particular GSM frame boundary, which occurs every 4.6 milliseconds, may be time-tagged. FIG. 5 shows the framing structure of GSM cellular signals. This timing information is then optionally passed via normal cellular signaling to another base station, such as base station 40 of FIG. 4.

Figure 6:
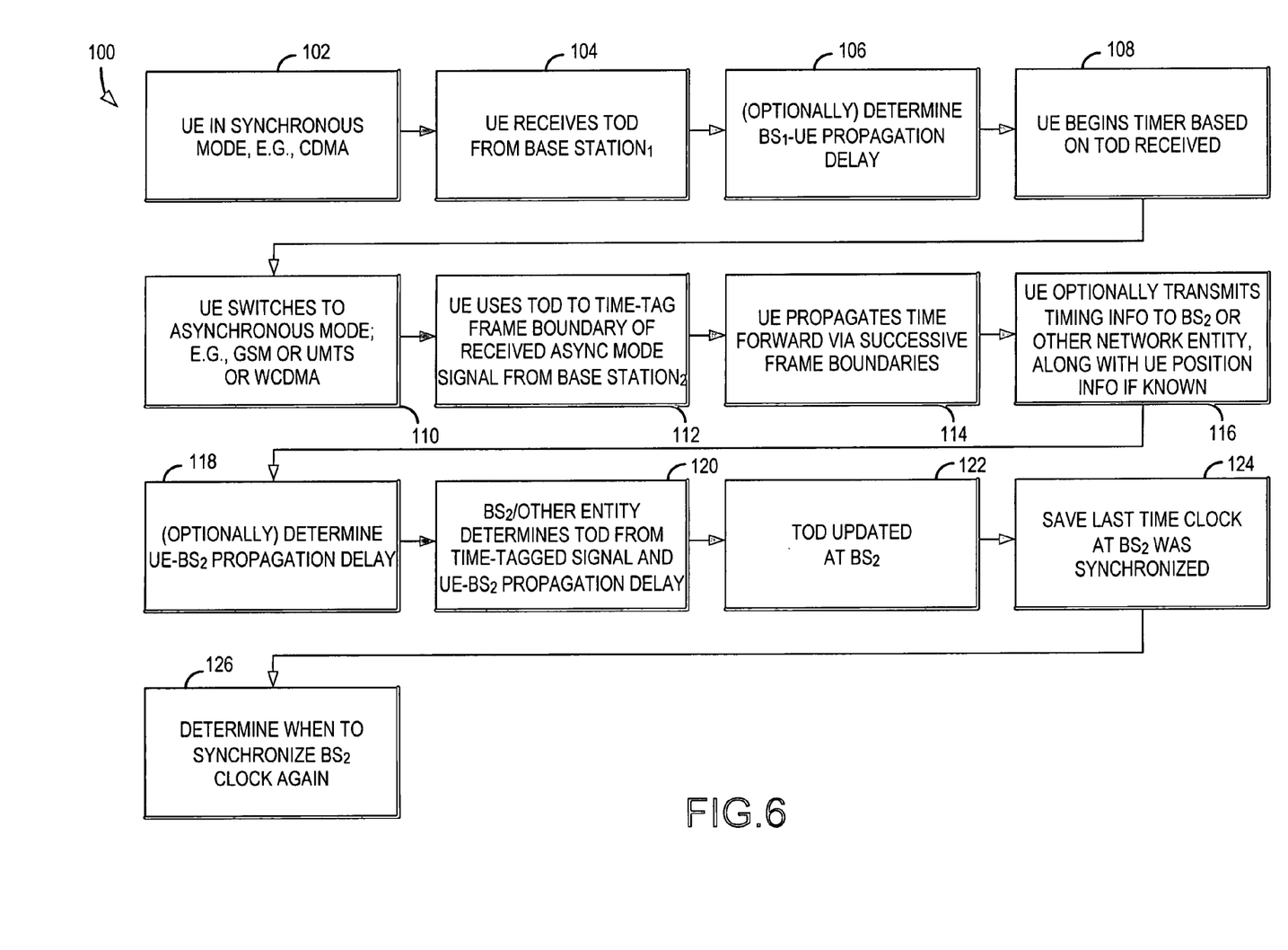
FIG. 6 illustrates a process for implementing the method described herein.
Figure 7A:
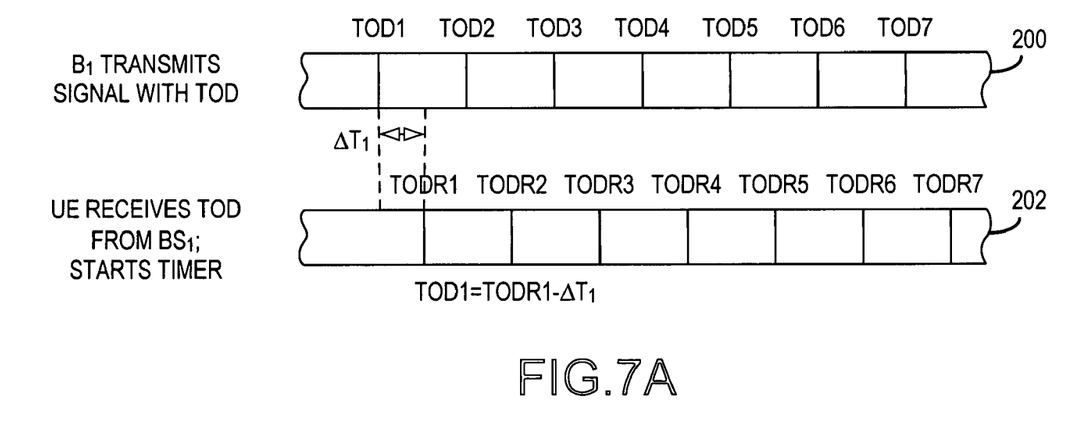
FIG. 7A illustrates a communication signal providing time-of-day information.
Figure 7B:
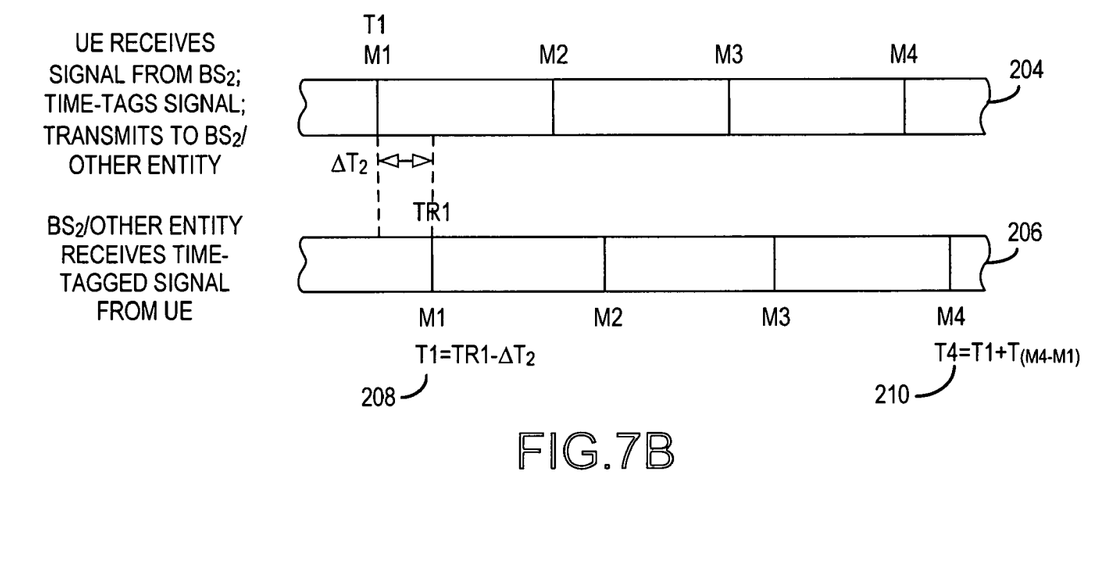
FIG. 7B illustrates a communication signal time-tagged according to the method described herein.

Propagation delays between the UE 10 (FIG. 4) and base stations can be determined for improved timing accuracy. Other residual timing errors may remain, such as multipath delays and transit delays through the UE hardware, and methods for accounting for these residual errors are also described. FIGS. 6 and 7 provide diagrams which aid in understanding the method for base station synchronization.

FIG. 6 provides a diagram 100 of a process for implementing the method for base station synchronization described herein. User equipment 10 (FIG. 1), which has multi-mode capability—e.g. both synchronous, cellular duplex communication, such as but not limited to CDMA, and asynchronous, cellular duplex communication, such as but not limited to GSM, UMTS, and/or WCDMA capabilities—is initially set for operation in the synchronous mode 102, for example, CDMA communications mode. For ease in describing the methodology, CDMA will be assumed. While operating in the CDMA mode, UE 10 receives time-of-day information 104 in a CDMA signal from a first base station, such as base station 20 (FIGS. 2A, 4), that is time synchronized to other like base stations.

Figure 8:
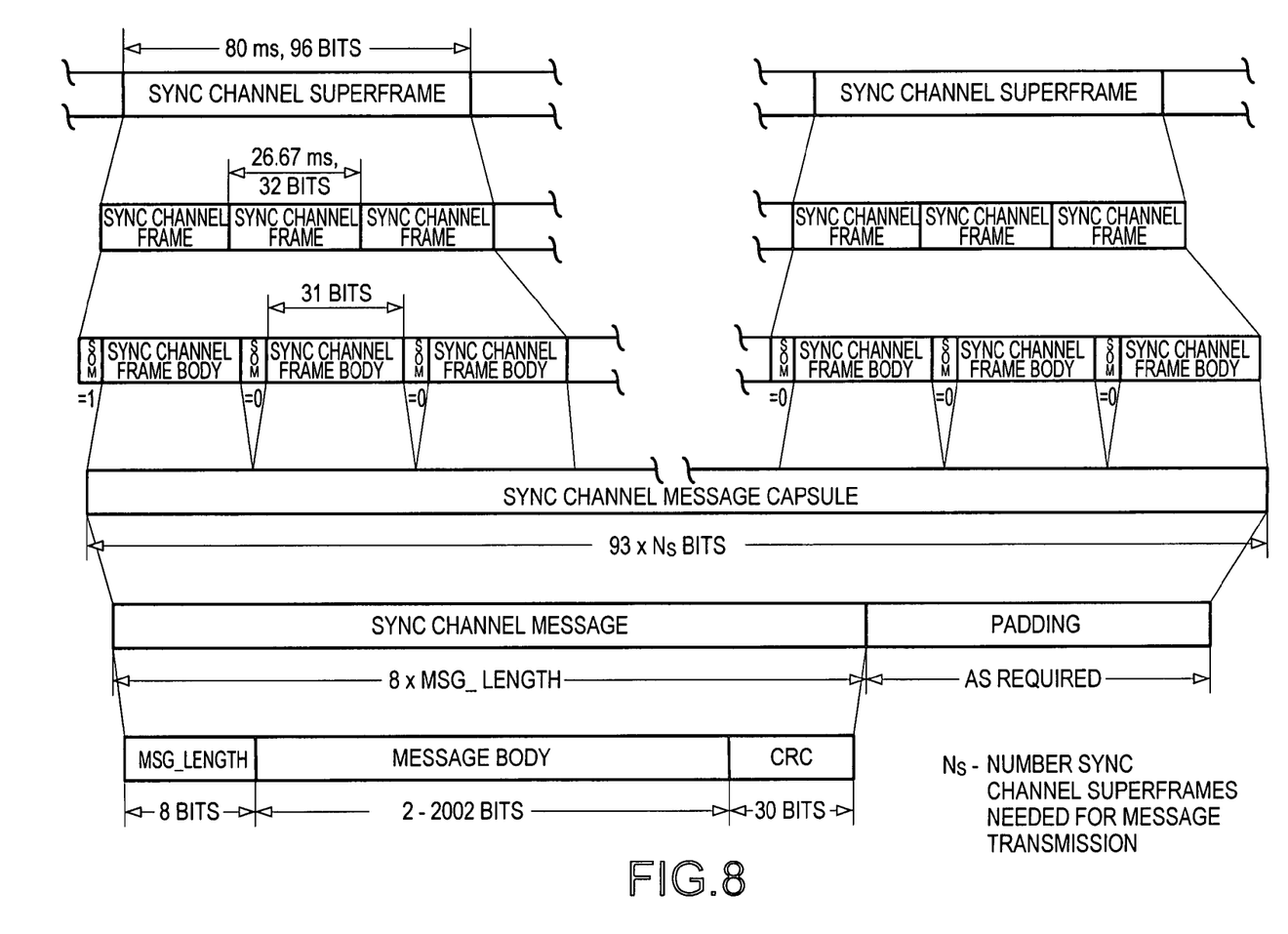
FIG. 8 illustrates a framing structure for the synchronization channel of a Code Division Multiple Access (CDMA) communication signal.

In a CDMA network, for example, time-of-day information is conventionally transmitted over the Sync Channel of the transmitted signal from the base station, which provides time and frame synchronization to a UE. FIG. 8 provides a diagram of a Sync Channel structure. Currently, the Sync Channel is divided into 80 millisecond superframes, each of which are divided into three 26.67 millisecond frames. The base station begins a new Sync Channel message capsule with the first bit of the first Sync Channel frame body of a Sync Channel superframe. Each Sync Channel message body is formatted to contain a 36-bit "system time" field related to GPS time. The base station sets this field to the system time as of four Sync Channel superframes (320 ms) after the end of the last superframe containing any part of the Sync Channel message, minus the pilot pseudo-random noise (PN) sequence offset, in units of 80 milliseconds. While the current CDMA Sync Channel format is described here, it will be understood by those skilled in the art that other methods of formatting time-of-day information over a signal transmitted from a base station are equally applicable to the method for base station synchronization described herein.

After UE 10 receives the TOD from the base station, UE 10 optionally compensates for propagation delay between the base station and UE 10, depending upon the timing accuracy required or desired, 106 (FIG. 6). Methods for determining propagation delay are described further below. UE 10 then starts a timer based upon the TOD received 108 to track TOD from this point forward, and/or it can continuously update time based on TOD received from the base station.

UE 10 is then switched to the asynchronous cellular communications mode, such as GSM, UMTS, or WCDMA operating mode 110. For purposes of illustrating operation of the method for base station synchronization described herein, GSM operating mode will be assumed. Once in the GSM operating mode, UE 10 uses the known TOD to time-tag a frame boundary of a received GSM signal 112. Suitable processing means and computer readable media are provided in UE 10 to perform the time-tagging operation. UE 10 also propagates the timing forward via successive GSM frame boundaries 114, given the known time period of each frame boundary. (E.g., see FIG. 5.)

Optionally, UE 10 transmits the known timing information to a base station, such as base station 40 (FIGS. 2b and 4) or other suitable network entity such as a server, 116. For example, a server may use the timing information to time-synchronize more than one base station in the network. If UE position information is known, this information can be transmitted along with the timing information to base station 40 or other network entity. Optionally, the propagation delay between UE 10 and base station 40 is determined 118, depending upon the timing accuracy required or desired, as discussed further below. Base station 40 and/or other network entity assisting base station 40, then determines the TOD from the timing information transmitted from UE 10, and optionally accounts for the propagation delay between UE 10 and the base station or other network entity, 120.

TOD is then updated at the base station 122, and the time at which TOD was updated can be saved in order to track the synchronization of the base station, 124, in order to determine when it is appropriate to update the base station clock to synchronize the clock with other clocks in other base stations. The base station, or a remote entity which assists the base station, may determine when to synchronize again 126. For example, a set time of several minutes may automatically trigger another synchronization process. Alternatively, other techniques may be utilized to determine when to again synchronize the clock at the base station to other clocks of other base stations.

A plurality of base stations 40 (FIG. 4) operating in the asynchronous communication system can be time-synchronized due to transmission of timing information in the manner described from a UE 10 to a plurality of base stations 40, or by transmission of timing information in the manner described from a plurality of UEs 10 to a plurality of base stations 40. A plurality of base stations may also be time-synchronized via a server which receives the timing information from one or more UEs 10.

FIGS. 7A and 7B aid in demonstrating the methodology of FIG. 6 in which time-of-day information received from a first base station 20, such as that in a CDMA network, is used by UE 10 to time-tag the framing structure of a signal, such as a GSM, UMTS or WCDMA signal. FIG. 7A shows a signal 200 having time-of-day "markers" TOD1, TOD2, etc. as it is transmitted from a first base station, such as base station 20 (FIGS. 2A, 4), to UE 10, and that same signal 202 as it is received by UE 10 delayed in time due to propagation from the base station to the UE. The TOD markers may be an inherent part of the framing structure of the signal 200, for example, as provided by the Sync Channel structure (FIG. 8), described above. If necessary or desired, the propagation delay, $\epsilon T_1$, from the first base station to the UE can be determined as described further below, and accounted for by subtraction. Thus, signal 202 contains TOD information as it is received (TODR), with propagation delay $\epsilon T_1$. As shown in FIG. 7A, UE 10 can either start a timer that tracks the TOD from this point forward, and/or it can continuously update time based on TOD received from the base station.

Because UE 10 knows the proper TOD, and after switching to the asynchronous mode, UE 10 then time-tags a frame boundary of a received signal such as a GSM signal 204. For instance, the start of a particular GSM frame boundary, which occurs every 4.6 milliseconds, may be time-tagged. UE 10 can also propagate the timing forward via successive GSM frame boundaries, given the known time period of each frame boundary. (E.g., see FIG. 5.) FIG. 7B shows time-tagged signal 204, such as a GSM signal, having markers M1, M2, etc. The TOD at some particular time T1 is associated with marker M1, and the TOD at time T2 is associated with marker M2, etc. by the UE. This signal is optionally transmitted by UE 10 to a second base station, such as base station 40 (FIGS. 2B, 4). The signal is received 206 by the second base station 40 delayed in time, $\epsilon T_2$, due to propagation from the UE to the base station. If necessary or desired, the propagation delay, $\epsilon T_2$, from the UE to the second base station can be determined as described further below. Thus, signal 206 contains timing information as it is received (TR1, TR2, etc.), with propagation delay $\epsilon T_2$.

As stated above, if possible UE 10 in operation 112 (FIG. 6) determines its position contemporaneously with the time-tagging of the marker in the signal. Knowledge of UE position aids in determining propagation delay, $\epsilon T_2$. For example, a GPS receiver in the UE may determine its position either autonomously (e.g. a conventional hardware correlator-based GPS receiver may by itself determine its position by reading ephemeris data from GPS satellites) or it may determine its position with the assistance of a server, such as the location server shown in FIG. 3 which is coupled to the network. As stated, in operation 116 (FIG. 6), the UE transmits its position (or pseudoranges to allow a location server to determine its position) to the base station and the time associated with the marker, as time-tagged by the UE. In operation 120 (FIG. 6), the second base station then computes its time-of-day by using the position of the UE and its known predetermined position to determine the propagation delay, $\epsilon T_2$, between the UE and base station, although other methods of determining this propagation delay can also be implemented as described below. Returning to FIG. 7B, this propagation delay, $\epsilon T_2$, is subtracted from the time associated with the marker 208 to determine time at its transmitted marker, thus accounting for the propagation delay. The current time, for example at marker M4, can then be determined by knowledge of the time period between successive frame markers. Thus, the time T4 at marker M4 would be equal to the time T1 at marker M1, plus the intervening time period between markers M4 and M1, 210.

It will be understood by those skilled in the art that systems other than a synchronous cellular communication network can provide the time-of-day utilized by UE 10 to time-tag the signal received from an asynchronous cellular network. For example, a non-cellular system, such as but not limited to a "MediaFlow" broadcast system, may provide time-of-day information to the UE provided that the UE is operable to receive signals from the non-cellular system. This timing information is then used by the UE to time-tag the asynchronous communication signal in the same or similar manner as described above.

A variety of methods may be used to estimate the propagation delay between UE 10 and a base station. A highly accurate approach can be employed when the UE and/or a location server have accurately determined UE position, such as via a GPS unit, and the base station location is precisely known, such as through a previous survey. For example, in a CDMA network, the "paging" channel provides base station position. In this case the propagation delay may be determined, typically at some network entity, by dividing the range between the UE and base station by the speed of light. A base station may determine the timing of its transmitted frame marker by simply subtracting the computed propagation time from the frame marker timing provided by the UE.

A second approach to estimating the UE to base station propagation delay is made possible by "timing advance" information already available within the UE and base station, such as base station 40. The originally intended purpose of such information concerns intra-cell traffic coordination. However, timing-advance metrics can be manipulated in a straightforward manner to yield UE to base station delay estimates. The time resolution of the communication bit intervals involved in timing advance information determines the accuracy afforded by these time alignment parameters. It is possible to achieve propagation delay estimates accurate to within a few or several tens of microseconds using this information. Although less precise, this second approach is particularly advantageous in situations where privacy concerns preclude network manipulation of the exact UE position.

Another method for determining the propagation delay between UE 10 and a base station is to simply divide the round-trip time between the UE and base station by two. Such a calculation may be implemented via a "timing probe" initially transmitted to the UE by the base station. The UE then immediately returns the timing probe to the base station, whereupon the base station receives and determines the round-trip time that was required for the signal to be transmitted to and received back from the UE. Although less typical, this method could be implemented in reverse, whereby the UE transmits the timing probe to the base station and the base station returns the probe to the UE.

In some applications the base stations need not be synchronized to microsecond accuracy but only to millisecond or even second accuracy. For these scenarios it may not be productive to compensate for the UE to base station delays since these small delays, on the order or tens of microseconds, are insignificant relative to the required timing accuracy. Thus, coarse time-of-day at the UE may simply be used as is to time-tag a signal. This is sent to the base station without the need for precision base station-UE ranging data. Once coarse time-tagging is performed, its accuracy may be maintained over long periods of time due to the high stability of the frequency of the data transmitted by the base station.

The foregoing methods determine effective time of transmission at the face of the base station antennas. The use of a large number of UEs may tend to reduce errors via averaging procedures. This assumes that system biases may be eliminated. Concerns about sufficient UE activity to support the timing, for example in the early morning hours, could be ameliorated by placing UEs at various locations and making calls periodically. Other sources of timing error could interfere with the accuracy of timing between a UE and base station. One such type of timing error is due to signal multipath between the UE and base station. The stability of the base station oscillator will also affect how often timing measurements need to be made and disseminated. It is possible to model the drift vs. time of the base station oscillator and reduce such updates.

Several methods for calibrating for UE receiver timing errors and effects will now be described. In certain embodiments of the method for base station synchronization, the UE 10 (FIG. 1) determines its location $P_{UE}=[x_{UE}, y_{UE}, z_{UE}]$ and a time associated with this location $T_{UE}$. It may associate this time with a framing marker of a received cellular communication signal by simply measuring the time delay from the time of location determination to that of the framing marker. Alternatively, the location determination may be made at a time equal to that of this framing marker. Thus, without loss of generality, it may be assumed that $T_{UE}$ equals the time of the framing marker as viewed by the UE.

Suppose the UE also knows the location of the base station, $P_{base}=[x_b, t_b, z_b]$. Then, if multipath delay is insignificant, the range from the base station to the UE at time $T_{UE}$ is $$R_{TUE}=[(x_{UE}-x_b)^2+(y_{UE}-y_b)^2+(z_{UE}-z_b)^2]^{1/2} \qquad (1)$$

If there were no delays within the receiving circuits, the propagation time delay between the base station and UE would be $R_{TUE}/c$, where c is the speed of light, as described above.

In order to be more explicit, the time of transmission of a framing marker at the base station is referred to as the time of occurrence of this marker at the face of the transmitting antenna of the base station. Accordingly, with no multipath delay, or receiver delays, the time of transmission of the frame marker at the base station's antenna face would be $T_{base}=T_{UE}-R_{TUE}/c$.

There may be a timing error, or delay, associated with the UE receiver's radio frequency (RF) and digital signal processing, $b_{comm}$. Thus, referring to FIG. 1, $b_{comm}$ is caused by delays within cellular communication transceiver 12 and UE control 16. Furthermore, there may be an extra delay in propagation from the base station to the UE receiver due to multipath, $b_{mult}$. Accordingly, instead of providing an unbiased measurement of the transmission time at the base station, a measurement with a bias (measured time minus true time) is provided of $b_{mult}+b_{comm}$. Typically $b_{mult}$ may dominate the other sources of error, especially if a receiver calibration function is performed. Thus, normally, the estimated time of transmission of the framing marker will be late.

For line-of-sight paths multipath delay, $b_{mult}$, has bias with mean zero. For reflected paths or paths combining direct and reflecting paths, the mean is greater than zero (measured versus true direct path delay). Within a short period of time, a base station will, in general, receive a number of estimates for the time associated with each frame marker from several UE units and perhaps from each UE unit as well. These TOD estimates are referred to as $D_1, D_2, \ldots D_K$. The smallest of these estimates will normally have a significantly lower mean bias than any individual measurement, or an average of the measurements. If the number of measurements, K, are large, measurements might be ranked from low to high and perhaps an average of the smallest 10% of the measurements could be taken, or some similar statistic. This would greatly reduce the mean bias, yet take advantage of some averaging.

If the base station has a highly stable clock, then this clock might be used to maintain time between updates from the remote UE units. The clock may be used in the smoothing process to eliminate poor measurements from the UEs due to multipath. Furthermore, the measurements from the UE may be used to measure the long-term stability of the base station clock, due to aging, for example. As an example, a GSM hyperframe is approximately 3.48 hours and a superframe is 6.12 seconds (FIG. 5). Accordingly, a hyperframe is around 12528 seconds. A typical CDMA TOD without differential corrections should be accurate to around 100 nanoseconds. This accuracy allows a measurement of long-term frequency of the base station oscillator equal to around 100 nanoseconds/12528 seconds=$8\times10^{-12}$. Even the measurement over a period of 6.12 seconds allows an accuracy of long-term frequency of approximately $1.6\times10^{-8}$. This measurement of long-term stability is best done by making several time-of-day measurements with the same UE. Hence, a stationary or slowly moving UE is best suited for this purpose. Successive measurements of the UE's position provides the required information regarding the UE receiver's dynamics.

If there is significant UE motion, then it is important that any Doppler related effects do not produce an error in the timing measurements described above. In particular, if the UE measures time at one instance and is predicting the time-of-day associated with a signal frame boundary occurring at a different instance, an error can result due to the UE's motion. This is especially the case if the UE is rapidly moving and/or the difference in these time instances is large. There are a number of ways to minimize or eliminate this problem. For example, if the UE can determine its velocity, then this data may be supplied to the base station which can then compensate for errors due to the Doppler associated with the range rate between the UE and the base station.

Each base station 40 (FIG. 4) such as, but not limited to those base stations utilized by GSM, UMTS or WCDMA networks, benefits from the method for base station synchronization described herein which synchronizes the base stations relative to one time standard, through improved location determination factors and user equipment handoffs. Improved triangulation, or ranging, based upon the use of timing information sent between each of several base stations and a UE may be obtained. Location can be determined via any time-of-arrival system. For example, Time Difference of Arrival (TDOA), Estimated Observed Time Difference (EOTD) and/or Uplink Time-Of-Arrival (UTOA) methodologies may be implemented when base stations are time synchronized. Many other uses of timing information may be made. These include allowing more efficient "handoff" of UE communications from one base station to the next base station, and permitting unambiguous time to be transmitted throughout the network for various purposes. Accurate timing at base stations also provides UEs timing information for aiding GPS based position calculations. Timing information may result in reduced time to first fix, and/or improved sensitivity with respect to assisted GPS (AGPS) systems. The required accuracy for these situations can range from a few microseconds to around ten milliseconds depending upon the performance improvement desired. In a hybrid system, base station timing serves the dual purpose of improving the time of arrival (TOA), EOTD, or TDOA operation as well as the GPS operation.

The foregoing description illustrates exemplary implementations, and novel features, of a method for base station synchronization. There are many aspects to this method because it may involve interaction between numerous components of a communications system. While some suggestions are provided for alternative uses and implementations of the method for base station synchronization, it is of course not practical to exhaustively list or describe such alternatives. Accordingly, the scope of the method should be determined only by reference to the appended claims, and should not otherwise be limited by features illustrated herein except insofar as such limitation is recited in an appended claim.

While the above description has pointed out novel features of the disclosed method for base station synchronization, the skilled person will understand that various omissions, substitutions, and changes in the form and details of the method illustrated may be made without departing from the scope of the method described herein. For example, the skilled person will be able to adapt the details described herein to communications systems having a wide range of modulation techniques, transmitter and receiver architectures, and generally any number of different formats.

Each practical and novel combination of the elements described hereinabove, and each practical combination of equivalents to such elements, is contemplated as an embodiment of the method for base station synchronization. Partly because many more element combinations are contemplated as embodiments than can reasonably be explicitly enumerated herein, the scope of the method for base station synchronization is properly defined by the appended claims rather than by the foregoing description. Furthermore, any operable possible combination of features described above should be considered as having been expressly and explicitly disclosed herein. All variations coming within the meaning and range of equivalency of the various claim elements are embraced within the scope of the corresponding claim. To this end, each described element in each claim should be construed as broadly as possible, and moreover should be understood to encompass any equivalent to such element insofar as possible without also encompassing the prior art.

The invention claimed is:

1. A user equipment device operable in a synchronous, cellular communication system and in an asynchronous, cellular communication system, the device comprising:
    means for synchronous, cellular communication;
    means for asynchronous, cellular communication; and
    means for time-tagging an asynchronous cellular communication signal with timing information received in a synchronous cellular communication signal.

2. The device of claim 1 wherein the means for synchronous, cellular communication comprises: a transceiver; CDMA communications modem; and an antenna.

3. The device of claim 1 wherein the means for asynchronous, cellular communication comprises:
a transceiver;
a modem selected from the group consisting of GSM, UMTS, and WCDMA communication modems; and
an antenna.

4. The device of claim 1 wherein the means for time-tagging an asynchronous cellular communication signal with timing information received in a synchronous cellular communication signal comprises: at least one processor; and a computer readable medium.

5. A computer program product residing on a processor-readable non-transitory medium in a user equipment device which is operable in a synchronous, cellular communication system and in an asynchronous, cellular communication system, the computer program product comprising instructions configured to cause a processor to:
begin a timer based upon time-of-day information received in a synchronous cellular communication signal; and
time-tag a frame boundary of a received asynchronous cellular communication signal using the timer.

6. The computer program product of claim 5 wherein the synchronous cellular communication signal is transmitted to the user equipment device from a first base station in the synchronous, cellular communication system.

7. The computer program product of claim 6 further comprising instructions configured to cause the processor to account for a propagation delay between the first base station and user equipment device.

8. The computer program product of claim 5 wherein the asynchronous cellular communication signal is transmitted to the user equipment device from a second base station in the asynchronous, cellular communication system.

9. The computer program product of claim 8 further comprising instructions configured to cause the processor to account for a propagation delay between the user equipment device and second base station.

10. The computer program product of claim 5 further comprising instructions configured to cause the processor to propagate time forward via successive frame boundaries.

11. The computer program product of claim 5 further comprising instructions configured to cause the processor to account for at least one timing error selected from the group consisting of receiver delays, signal processing delays, multipath delays, and Doppler effects.

12. A method for base station synchronization in an asynchronous cellular communication system, the method comprising:
receiving time-of-day in a synchronous cellular communication signal with user equipment operable in a synchronous cellular communications mode;
switching the user equipment to operate in an asynchronous cellular communications mode;
receiving an asynchronous cellular communication signal with the user equipment;
time-tagging with the user equipment a frame boundary of the received asynchronous cellular communication signal using the time-of-day; and
transmitting with the user equipment timing information to an entity of the asynchronous cellular communication system to determine time-of-day at the entity.

13. The method of claim 12 wherein the step of receiving time-of-day in a synchronous cellular communication signal comprises receiving time-of-day from a CDMA cellular communication signal.

14. The method of claim 12 further comprising the step of accounting for signal propagation delay between a base station which transmitted the synchronous cellular communication signal and the user equipment.

15. The method of claim 12 wherein the step of receiving an asynchronous cellular communication signal comprises receiving a GSM cellular communication signal.

16. The method of claim 12 wherein the step of receiving an asynchronous cellular communication signal comprises receiving a signal selected from the group consisting of UMTS and WCDMA cellular communication signals.

17. The method of claim 12 further comprising the step of propagating time forward via successive frame boundaries of the received asynchronous cellular communication signal.

18. The method of claim 12 wherein the step of transmitting timing information to an entity of the asynchronous cellular communication system comprises transmitting timing information to a base station of the asynchronous cellular communication system.

19. The method of claim 12 wherein the step of transmitting timing information to an entity of the asynchronous cellular communication system comprises communicating timing information to a server of the asynchronous cellular communication system.

20. The method of claim 19 further comprising the step of synchronizing a plurality of base stations with timing information from the server.

21. The method of claim 12 further comprising the step of determining signal propagation delay between the user equipment and asynchronous cellular communication system entity.

22. The method of claim 21 comprising the step of determining time-of-day at the asynchronous cellular communication system entity from the time-tagged signal and signal propagation delay between the user equipment and asynchronous cellular communication system entity.

23. The method of claim 12 further comprising the step of determining when to synchronize a base station of the asynchronous cellular communication system.

24. The method of claim 12 further comprising the step of utilizing time-of-day information at the asynchronous cellular communication system entity for improving at least one system feature selected from the group consisting of location determination factors and user equipment handoffs.

25. The method of claim 12 further comprising the step of accounting for at least one timing error selected from the group consisting of receiver delays, signal processing delays, multipath delays, and Doppler effects.

26. A method for time synchronizing a base station in an asynchronous cellular communication system, the method comprising:
receiving time-of-day from a non-cellular system signal with user equipment operable to receive signals from the non-cellular system;
receiving an asynchronous cellular communication signal with the user equipment;
time-tagging with the user equipment a frame boundary of the received asynchronous cellular communication signal using the time-of-day; and
transmitting with the user equipment timing information to an entity of the asynchronous cellular communication system to determine time-of-day at the entity.

27. User equipment operable with a synchronous cellular communication system and an asynchronous cellular communication system, the user equipment comprising:
- a synchronous cellular communication module configured to receive a synchronous cellular communication signal;
- an asynchronous cellular communication module configured to receive an asynchronous cellular communication signal; and
- a processor coupled to the synchronous cellular communication module and the asynchronous cellular communication module and configured to time-tag the asynchronous cellular communication signal with timing information received in the synchronous cellular communication signal.

28. User equipment operable with a synchronous cellular communication system and an asynchronous cellular communication system, the user equipment comprising:
- a position location module configured to receive a timing signal;
- an asynchronous cellular communication module configured to receive an asynchronous cellular communication signal; and
- a processor coupled to the position location module and the asynchronous cellular communication module and configured to time-tag the asynchronous cellular communication signal with timing information received in the timing signal.

* * * * *